US012602833B2

(12) United States Patent
Tanaka

(10) Patent No.: US 12,602,833 B2
(45) Date of Patent: Apr. 14, 2026

(54) IMAGE ANALYSIS DEVICE AND IMAGE ANALYSIS METHOD

(71) Applicant: NEC Corporation, Tokyo (JP)

(72) Inventor: Taichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 347 days.

(21) Appl. No.: 18/027,687

(22) PCT Filed: Sep. 29, 2020

(86) PCT No.: PCT/JP2020/036843
§ 371 (c)(1),
(2) Date: Mar. 22, 2023

(87) PCT Pub. No.: WO2022/070242
PCT Pub. Date: Apr. 7, 2022

(65) Prior Publication Data
US 2023/0377201 A1 Nov. 23, 2023

(51) Int. Cl.
*G06T 7/00* (2017.01)
*G01S 13/90* (2006.01)
*G06T 7/30* (2017.01)

(52) U.S. Cl.
CPC ............ *G06T 7/97* (2017.01); *G01S 13/9023* (2013.01); *G06T 7/30* (2017.01)

(58) Field of Classification Search
CPC .......... G06T 7/97; G06T 7/30; G01S 13/9023
See application file for complete search history.

(56) References Cited

U.S. PATENT DOCUMENTS 10,698,104 B1 * 6/2020 Simonson ............... G06T 7/254
2019/0353779 A1 11/2019 Wan et al.

FOREIGN PATENT DOCUMENTS

| CN | 103439708 A | 12/2013 | |
| CN | 113795773 A * | 12/2021 | ........... B60W 60/00 |
| JP | 2012-533051 A | 12/2012 | |
| JP | 2014-095585 A | 5/2014 | |

(Continued)

OTHER PUBLICATIONS

"Antonio De Maio et al., Detection of Single Scatterers in Multi-dimensional SAR Imaging, Jul. 2020, IEEE Transactions on Geoscience and Remote Sensing, vol. 47, No. 7" (Year: 2020).*

(Continued)

*Primary Examiner* — Chineyere Wills-Burns
*Assistant Examiner* — Phuong Hau Cai
(74) *Attorney, Agent, or Firm* — Sughrue Mion, PLLC

(57) ABSTRACT

The image analysis device 100 includes a pixel selection unit 11 which selects multiple pixels at a plurality of positions in one image among multiple images in which the same area is recorded, a dimension reduction unit 12 which compresses a complex vector as an evaluation value when an evaluation function is optimized into a low-dimensional space, an expanding unit 13 which returns a compression result by the dimension reduction unit 12 to an original pixel space, and calculates a spatial correlation phase estimate; and an optimization unit 14 which optimizes the evaluation function by bringing the evaluation value closer to the spatial correlation phase estimate and a pixel value at the position selected by the pixel selection unit 11.

12 Claims, 14 Drawing Sheets

(56) References Cited

FOREIGN PATENT DOCUMENTS

| WO | 2011/003836 A1 | 1/2011 |
| WO | 2019/106850 A1 | 6/2019 |

OTHER PUBLICATIONS

"Rick Lyons, FFT Interpolation Based on FFT Samples: A Detective Story With a Surprise Ending, Apr. 2018, Blogs, Rick Lyons, DSP Related.com" (Year: 2018).*

"Bo Zhu et. al., Image Reconstruction by Domain-Transform Manifold Learning, 2018, Nature, 555, 487-492" (Year: 2018).*

"Start01 et. al., Why does FFt output need to conjugate processing?, 2018, dsp stackexchange.com, Signal Processing" (Year: 2018).*

"H. Emre Guven et. al., An Augmented Lagrangian Method for Complex-Valued Compressed SAR Imaging, Sep. 2016, IEEE Transactions on Computational Imaging, vol. 2, Issue 3" (Year: 2016).*

International Search Report for PCT Application No. PCT/JP2020/036843, mailed on Dec. 8, 2020.

A. M. Guarnieri et.al., "On the Exploitation of Target Statistics for SAR Interferometry Applications", IEEE Transactions on Geoscience and Remote Sensing, vol. 46, No. 11, pp. 3436-3443, Nov. 2008.

* cited by examiner

FIG. 3

IMAGE ANALYSIS DEVICE AND IMAGE ANALYSIS METHOD

This application is a National Stage Entry of PCT/JP2020/036843 filed on Sep. 29, 2020, the contents of all of which are incorporated herein by reference, in their entirety.

TECHNICAL FIELD

This invention relates to an image analysis device and an image analysis method applicable to an image analysis system that performs image analysis based on phases of received electromagnetic waves from a synthetic aperture radar.

BACKGROUND ART

Synthetic aperture radar (SAR) technology is a technology for obtaining an image equivalent to the image by an antenna having a large aperture, when a flying object such as an artificial satellite, aircraft, or the like transmits and receives a radio wave while the flying object moves. The synthetic aperture radar is utilized, for example, for analyzing an elevation or a ground surface deformation by signal-processing reflected waves from the ground surface, etc. In particular, when accuracy is required, the analyzer takes time-series SAR images (SAR data) obtained by a synthetic aperture radar as input, and performs time-series analysis of the input SAR images.

Interferometric SAR analysis is an effective method for analyzing an elevation or a ground surface deformation. In the interferometric SAR analysis, the phase difference between radio signals of plural (for example, two) SAR images taken at different times is calculated. Based on the phase difference, a change in distance between the flying object and the ground that occurred during the shooting time period is detected.

Patent literature 1 describes an analysis method that uses a coherence matrix. A coherence matrix represents correlation of pixel values at the same position in multiple complex images.

The coherence is calculated by complex correlation of pixel values at the same position in plural SAR images among S (S≥2) SAR images. Suppose that (p, q) is a pair of SAR images and $c_{p,\,q}$ are components of the coherence matrix. Respective p and q are less than or equal to S and indicate one of the S SAR images. The phase $\theta_{p,\,q}$ (specifically, the phase difference) is calculated for each pair of SAR images. Then, an absolute value of the value obtained by averaging $\exp(-j\theta_{p,\,q})$ for a plurality of pixels in a predetermined area including pixels to be calculated as coherence is the component $c_{p,\,q}$ of the coherence matrix.

The magnitude of the variance of the phase $\theta_{p,\,q}$ can be determined from the absolute value of c, i.e., $|c_{p,\,q}|$.

The coherence matrix includes information, such as variance, that allows the degree of phase noise to be estimated.

The fact that phase $\theta_{p,\,q}$ correlates with a displacement velocity and a shooting time difference is used for displacement analysis of the ground surface and other objects. For example, the displacement is estimated based on the average value of the phase difference. It is possible to verify the accuracy of the displacement analysis using the amount of phase noise. Thus, the coherence matrix can be used for the displacement analysis.

For elevation analysis, the fact that the phase $\theta_{p,\,q}$ correlates with an elevation of the object being analyzed and a distance between the flying objects (for example, the distance between two shooting positions of the flying objects) is used. For example, the elevation is estimated based on the average value of the phase difference. It is possible to verify the accuracy of the elevation analysis using the amount of phase noise. Thus, the coherence matrix can be used for the elevation analysis.

Patent literature 1 describes a method of fitting a model such as displacement to a coherence matrix and recovering the phase excluding the effect of noise. A similar method is also disclosed in non-patent literature 1.

CITATION LIST

Patent Literature

PTL 1: International Publication No. 2011/003836

Non Patent Literature

NPL 1: A. M. Guarnieri et. al., "On the Exploitation of Target Statistics for SAR Interferometry Applications", IEEE Transactions on Geoscience and Remote Sensing, Vol. 46, No. 11, pp. 3436-3443, November 2008

SUMMARY OF INVENTION

Technical Problem

According to the method described in patent literature 1 and the method described in non-patent literature 1, noise included in the phase difference can be reduced. However, when displacement analysis and elevation analysis are performed, since it is desirable that as little noise as possible be included in the phase difference, more noise is desired to be removed.

It is an object of the present invention to provide an image analysis device and an image analysis method that can achieve a greater degree of phase noise reduction.

Solution to Problem

An image analysis device according to the present invention includes pixel selection means for selecting multiple pixels at a plurality of positions in one image among multiple images in which the same area is recorded, dimension reduction means for compressing a complex vector as an evaluation value when an evaluation function is optimized into a low-dimensional space, expanding means for returning a compression result by the dimension reduction means to an original pixel space, and calculating a spatial correlation phase estimate; and optimization means for optimizing the evaluation function by bringing the evaluation value closer to the spatial correlation phase estimate and a pixel value at the position selected by the pixel selection means.

An image analysis method according to the present invention includes selecting multiple pixels at a plurality of positions in one image among multiple images in which the same area is recorded, compressing a complex vector as an evaluation value when an evaluation function is optimized into a low-dimensional space, returning a compressing result to an original pixel space, and calculating a spatial correlation phase estimate; and optimizing the evaluation function by bringing the evaluation value closer to the spatial correlation phase estimate and a pixel value at the selected position.

An image analysis program according to the present invention causes a computer to execute a process of selecting multiple pixels at a plurality of positions in one image among multiple images in which the same area is recorded, a process of compressing a complex vector as an evaluation value when an evaluation function is optimized into a low-dimensional space, a process of returning a compressing result to an original pixel space, and calculating a spatial correlation phase estimate, and a process of optimizing the evaluation function by bringing the evaluation value closer to the spatial correlation phase estimate and a pixel value at the selected position.

Advantageous Effects of Invention

According to the present invention, the degree of phase noise reduction can be greater.

BRIEF DESCRIPTION OF DRAWINGS

FIG. 3 It depicts an explanatory diagram showing an example of a processing result of the dimension reduction unit, the expanding unit and the optimization unit.

DESCRIPTION OF EMBODIMENTS

Figure 1:
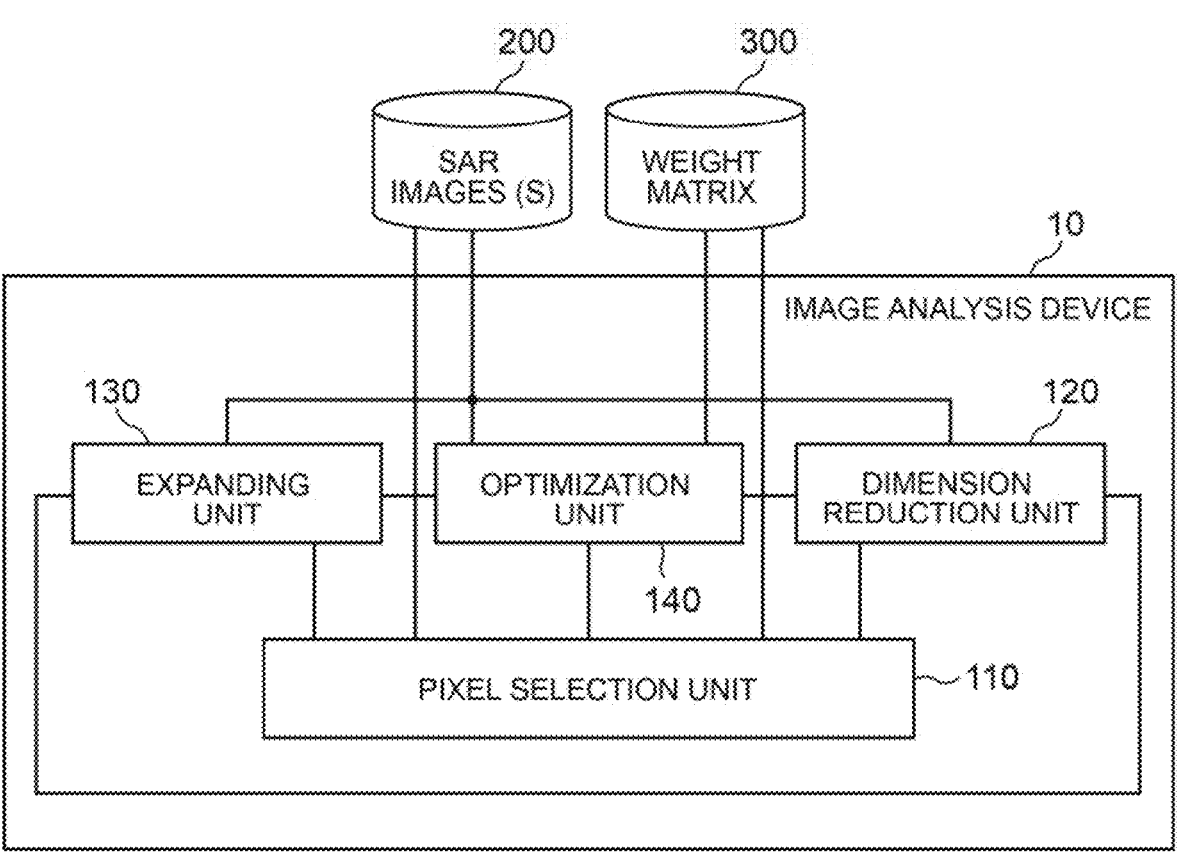
FIG. 1 It depicts a block diagram showing the image analysis device of the first example embodiment.

Hereinafter, example embodiments of the present invention will be explained with reference to the drawings.

In the following example embodiment, the image analysis device uses a first evaluation function (observed signal evaluation function) based on weighted observation signals (observed pixel values) and noise-free pixel values, and a second evaluation function (spatial correlation evaluation function) representing smooth distribution of phase differences in an image. The image analysis device calculates phase that is estimated to be noise-free using an evaluation function obtained by merging the observed signal evaluation function and the spatial correlation evaluation function. "Merging" is "sum", for example. Hereinafter, when simply expressed as "evaluation function," it means the evaluation function obtained by merging the observed signal evaluation function and the spatial correlation evaluation function.

The image analysis device of this example embodiment uses an inverse matrix with a negative sign of the absolute value of the coherence matrix as the weight. However, the inverse matrix with a negative sign of the absolute value of the coherence matrix is only one example. The image analysis device may use other parameters as the weight. When the inverse matrix with a negative sign of the absolute value of the coherence matrix is used as a weight, the image analysis device may include a coherence matrix calculation unit. The coherence matrix calculation unit calculates the coherence matrix as follows, for example That is, the coherence matrix calculation unit calculates a coherence matrix C for S SAR images (complex images: including amplitude and phase information) stored in the SAR matrix storage, for example. For example, suppose that a pair of SAR images is (p, q) and components of the coherence matrix C are $c_{p, q}$. p and q are values less than or equal to S, respectively, indicating one of the SAR images. The coherence matrix calculation unit calculates the phase $\theta_{p, q}$ (specifically, the phase difference) for the pair of SAR images. Then, the coherence matrix calculation unit sets the value obtained by averaging $\exp(-j \theta_{p, q})$ for a plurality of pixels in a predetermined area including pixels to be calculated as coherence to the component $c_{p, q}$ of the coherence matrix C.

The coherence matrix calculation unit may also average $A_p \cdot A_q \cdot \exp(-j\theta_{p, q})$ with $A_p$ as intensity in SAR image p and $A_q$ as intensity in SAR image q. The coherence matrix calculation unit may divide each element of the matrix obtained as the average of $A_p \cdot A_q \cdot \exp(-j\theta_{p, q})$ by a value which is obtained by dividing a sum of diagonal components of the matrix by S. The coherence matrix calculation unit may multiply a diagonal matrix from left to right, wherein the diagonal matrix is a matrix having diagonal components which are the $-\frac{1}{2}$ power of diagonal components of the matrix obtained as the average of $A_p \cdot A_q \cdot \exp(-j\theta_{p, q})$.

This method of calculating the coherence matrix is just one example, and the coherence matrix calculation unit can calculate the coherence matrix using various methods.

Several expressible functions may be used as the observed signal evaluation function. In the following example embodiments, the observed signal evaluation function is, as an example, an evaluation function (for example, a product-sum operation formula) including at least a noise-free pixel value x, i.e., an estimated pixel value x as an evaluation value, and a weight W (in the following example embodiments, an inverse matrix $|C|^{-1}$ with a negative sign, i.e. $-|C|^{-1}$, of the absolute value $|C|$ of the coherence matrix C and an observed pixel value y as parameters.

The image analysis device may include a spatial correlation prediction unit. The spatial correlation prediction unit predicts the correlation coefficients of pixels in an image and generates a spatial correlation matrix K which is a matrix whose elements are correlation coefficients. The spatial correlation matrix K is a matrix whose elements are the correlation coefficients of pixels. However, the spatial correlation matrix K is an example of an expression of spatial correlation, and other expressions may be used.

For example, the spatial correlation prediction unit generates (calculates) spatial correlation (correlation of pixels in the area to be analyzed) based on prior information (known data) regarding the area to be analyzed (which may be the entire area) in the SAR image.

The prior information is given to the spatial correlation prediction unit in advance. The following information, for example, is illustrated as prior information.

The schematic shape of the object to be analyzed (for example, a structure that is the object of displacement analysis) in the image analysis system to which the image analysis device 10 is applied. As an example, when the object is a long and narrow shaped structure such as a steel tower, the spatial correlation is generated so that the pixels are smoothly correlated in the extending direction of the structure.

Weights in the graph (nodes: pixels, edges (weights): correlations) for which the correlations are known. When using this prior information, a spatial correlation matrix K whose elements are values based on the weights is generated.

Information obtained from SAR images obtained in the past. That is, the correlation of pixels in known images of the area to be analyzed.

The spatial correlation evaluation function including the spatial correlation matrix K, which is generated based on prior information corresponds to a function representing smooth distribution of phase differences in an image.

Prior information is not limited to the above examples, but can be other types of information as long as the spatial correlation of the object to be analyzed can be predicted.

Several expressible functions may be used as the spatial correlation evaluation function. In the following example embodiments, the spatial correlation evaluation function is, as an example, an evaluation function (for example, a product-sum operation formula) including at least a pixel value x as an evaluation value, and a spatial correlation matrix K (actually, the inverse matrix $K^{-1}$ of the spatial correlation matrix K) as a parameter, which corresponds to a kind of weight.

In the following example embodiments, the image analysis device does not perform an optimizing process using the observed signal evaluation function for all pixels (pixel 1 to pixel N) in a predetermined area, but rather performs an optimizing process using the observed signal evaluation function for M (M<N) pixels selected from all pixels.

As mentioned above, the evaluation function includes the observation signal evaluation function and the spatial correlation evaluation function, and the image analysis device performs an optimizing process after performing reduced-dimensional decomposition (low-rank approximation) of the spatial correlation matrix K in the spatial correlation evaluation function. In detail, the image analysis device substantially reduced-dimensional decomposes the inverse matrix $K^{-1}$ of the spatial correlation matrix K. The image analysis device can, for example, perform reduced-dimensional decomposition using a method called Nystrom approximation. In that case, the image analysis device reduced-dimensional decomposes the inverse matrix $K^{-1}$ of the spatial correlation matrix K using equation (1).

$$K^{-1} \approx \Lambda - VGV^T \qquad \text{[Math. 1]}$$

In equation (1), G is a d×d matrix (d<N). V is an S×d matrix (V=$v_1$, $v_2$, . . . , $v_d$). $\Lambda$ is an N×N diagonal matrix.

Example Embodiment 1

FIG. 1 is a block diagram showing a configuration example of the image analysis device of the first example embodiment. The image analysis device 10 shown in FIG. 1 includes a pixel selection unit 110, a dimension reduction unit 120, an expanding unit 130, and an optimization unit 140. As mentioned above, the image analysis device 10 may include a coherence matrix calculation unit and a spatial correlation prediction unit (not shown in FIG. 1).

A SAR image storage 200 stores SAR images in advance. The weights used in the optimizing process are stored in advance in a weight matrix storage 300. In this example embodiment, a weight matrix as a weight is stored in the weight matrix storage 300. The SAR image storage 200 and the weight matrix storage 300 may be external to or included in the image analysis device 10.

The pixel selection unit 110 selects multiple pixels in one SAR image from multiple SAR images in which the same area is recorded. Then, the pixel selection unit 110 identifies pixels in other SAR images that are in the same position as the pixel in the above one SAR image. The pixel selection unit 110 specifies the position of the identified pixel. The dimension reduction unit 120 maps the pixel values at the position specified by the pixel selection unit 110 to a low-dimensional space. The expanding unit 130 maps the pixel values at the position specified by the pixel selection unit 110 from the low-dimensional space to the original pixel space.

The optimization unit 140 uses the weight matrix for a pair of the above one SAR image and the other SAR image. The pixel selection unit 110 specifies a common position in the one SAR image and the other SAR image. Then, the optimization unit 140 derives a pixel value (represented by a complex vector; and corresponding to $x_{samp,s}$ described below) having a phase that is closer to both a calculation result output from the expanding unit 130 and a pixel value (observed pixel value) of the observed pixel at the position specified by the pixel selection unit 110.

The optimization unit 140 brings the complex vector having phase closer to the calculation result output from the expanding unit 130 by optimizing (for example, maximizing) the spatial correlation evaluation function. The optimization unit 140 brings the complex vector closer to the pixel value of the observed pixel at the position specified by the pixel selection unit 110 by optimizing (for example, maximizing) the observed signal evaluation function. When the observation signal evaluation function is optimized, the complex vector approaches the pixel value of the observed pixel in the area where the noise is relatively small.

Although the pixel selection unit 110 specifies the position of the pixel in this example embodiment, the pixel selection unit 110 may read the corresponding pixel (specifically, the pixel value) from the SAR image storage 200 and supply the read pixel value to the dimension reduction unit 120, the expanding unit 130 and the optimization unit 140.

Figure 2:
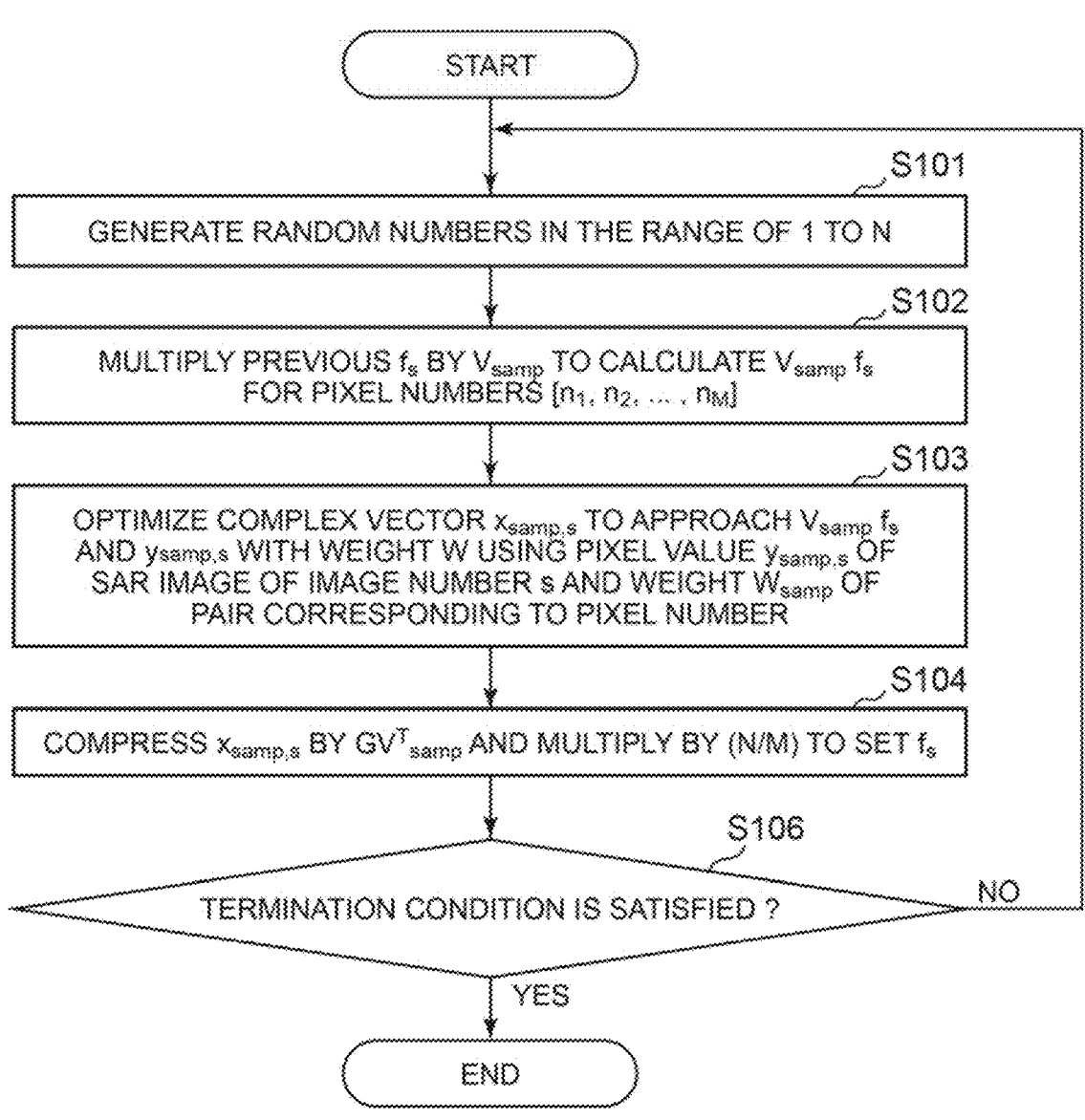
FIG. 2 It depicts a flowchart showing an operation of the image analysis device of the first example embodiment.

Next, the operation of the image analysis device 10 in this example embodiment will be explained with reference to the flowchart of FIG. 2. The weight W is stored in advance in the weight matrix storage 300. The inverse matrix $K^{-1}$ of the spatial correlation matrix K expressed in equation (1) is set in advance in the image analysis device 10. The dimension reduction unit 120 uses a matrix $GV^T$ which is a part of the inverse matrix $K^{-1}$ of the spatial correlation matrix K. The expanding unit 130 uses a matrix V which is a part of the inverse matrix $K^{-1}$ of the spatial correlation matrix K. Thus, the matrices $GV^T$ and V may be set to the image analysis device 10.

The pixel selection unit 110 generates M (M<N) random numbers (step S101). N is the total number of pixels in the SAR image. M is a value greater than or equal to 2.

Hereinafter, $n_m$ is the pixel number of the pixel to be selected (m: 1 to M). It should be noted that $n_m$ will be one of 1 to N. S is the total number of SAR images. Let s be the image number (s: 1 to S). In addition, $n_m$ may be expressed as samp. The pixel selection unit 110 uses each of generated multiple random numbers as the pixel number of the pixel to be selected. In other words, the pixel selection unit 110 selects pixels randomly.

The expanding unit 130 multiplies the previous $f_s$ by $V_{samp}$ (step S102). The previous $f_s$ means the result of the operation of step S104 performed immediately before. Each of $V_{samp}$ (samp: 1 to N) is a row vector generated by taking n1 rows, n2 rows, . . . , $n_M$ rows from the matrix V. That is, for each pixel in the row corresponding to pixel numbers $n_1$, $n_2$, . . . , $n_M$, the expanding unit 130 calculates $V_{samp} f_s$ using the corresponding row vector in matrix V. Hereinafter, $V_{samp} f_s$ is sometimes referred to as spatial correlation phase estimate.

As described below, $f_s$ corresponds to a value (complex data) obtained by multiplying $GV^T$ by $x_{samp,s}$ in the above equation (1). Thus, $V_{samp} f_s$ corresponds to a value (complex data) obtained by multiplying VGV by $x^T_{samp,s}$ in equation (1). Since "s" in "samp,s" is the image number, for example, "samp,1" is an index that specifies the selected pixel in the SAR image with image number 1.

The optimization unit 140 optimizes (for example, maximizes) the evaluation function (step S103). By optimizing the evaluation function, $x_{samp,s}$ approaches the optimal value. As mentioned above, the evaluation function is an evaluation function that merges the observed signal evaluation function which includes at least the weight W and the observed pixel value y as parameters in addition to the pixel value x which is assumed to be noise-free as an evaluation value, and the spatial correlation evaluation function whose parameter is the spatial correlation matrix K (actually, the inverse matrix $K^{-1}$ of the spatial correlation matrix K).

In the process of step S103, the optimization unit 140 performs a process to bring $x_{samp,s}$ closer to $y_{samp,s}$ weighted by $W_{samp}$ (in this example embodiment, the inverse matrix of the S×S coherence matrix corresponding to the selected pixels) with respect to the observed signal evaluation function and to the spatial correlation phase estimate $V_{samp} f_s$ with respect to the spatial correlation evaluation function.

The dimension reduction unit 120 compresses $x_{samp,s}$ optimized by the optimization unit 140 using $GV^T_{samp}$ (step S104). Namely, the dimension reduction unit 120 multiplies $x_{samp,s}$ by $GV^T_{samp}$. The dimension reduction unit 120 further multiplies the multiplication result by (N/M). The value by which the multiplication result is multiplied by (N/M) is expressed as $f_s$. Since steps S102 to S104 are executed for M pixels selected from all N pixels, the multiplication result between $x_{samp,s}$ and $GV^T_{samp}$ is (M/N) times the original value. The dimension reduction unit 120 multiplies the multiplication result by (N/M) to restore the original value.

For example, the dimension reduction unit 120 incorporates a memory. The dimension reduction unit 120 is configured to temporarily store $f_s$ in the memory (not shown in FIG. 1) and pass it to the expanding unit 130.

When the termination condition is satisfied, the process is terminated (step S106). When the termination condition is not satisfied, the process returns to step S101. In the process of next step S101, the pixel selection unit 110 selects a different pixel group from the previously selected pixel group (which may partially overlap).

The termination condition is, for example, that $V_{samp} f_s$ as the spatial correlation phase estimate output from the expanding unit 130 is less than a predetermined value relative to the value obtained in the previous step S102. Namely, the termination condition is that the amount of variation in $V_{samp} f_s$ is smaller. In other words, the termination condition is that $V_{samp} f_s$ is determined to have converged to the optimal value. The termination condition may also be that $x_{samp,s}$ output from the optimization unit 140 is less than a predetermined value relative to the value obtained in the previous step S103. In other words, the termination condition may be that the amount of variation in $x_{samp,s}$ is smaller. That is, the termination condition may be that $x_{samp,s}$ is determined to have converged to the optimal value. Such termination conditions are examples, and other conditions, for example, the condition that the process of S101 to S104 is executed a predetermined number of times, may be used.

As explained above, in this example embodiment, the dimension reduction unit 120 calculates $GV^T_{samp} x_{samp,s}$. The expanding unit 130 expands $GV^T_{samp} x_{samp,s}$ multiplied by (N/M) ($f_s$) by V. The optimization unit 140 optimizes the spatial correlation evaluation function using a different pixel group than the previously selected pixel group with respect to the observed signal evaluation function. As the dimension reduction unit 120, the expanding unit 130, and the optimization unit 140 repeat the process, $x_{samp,s}$ converges to the optimal value. [0055] Namely, the image analysis device 10 obtains a phase close to the phase of the observed signal by optimizing the spatial correlation evaluation function, while the phase difference is smoothly distributed by optimizing the observation signal evaluation function. Thus, the degree of phase noise reduction can be increased.

In addition, since the inverse matrix $K^{-1}$ of the spatial correlation matrix K is reduced-dimensional decomposed, the amount of memory used can be reduced compared to the case where it is not reduced-dimensional decomposed. Specifically, the used amount of memory is (number of dimensions of $f_s$×number of images)+number of selected pixels× (number of images)).

Further, the optimization unit 140 performs the optimizing process on the pixels randomly selected from all pixels with respect to the observation signal evaluation function. Thus, the amount of calculation in the optimization unit 140 is reduced.

In this example embodiment, the pixel selection unit 110 selects pixels randomly, but it does not have to select randomly. For example, the pixel selection unit 110 may select M pixels from N pixels in a predetermined area according to a predetermined rule.

Figure 3:
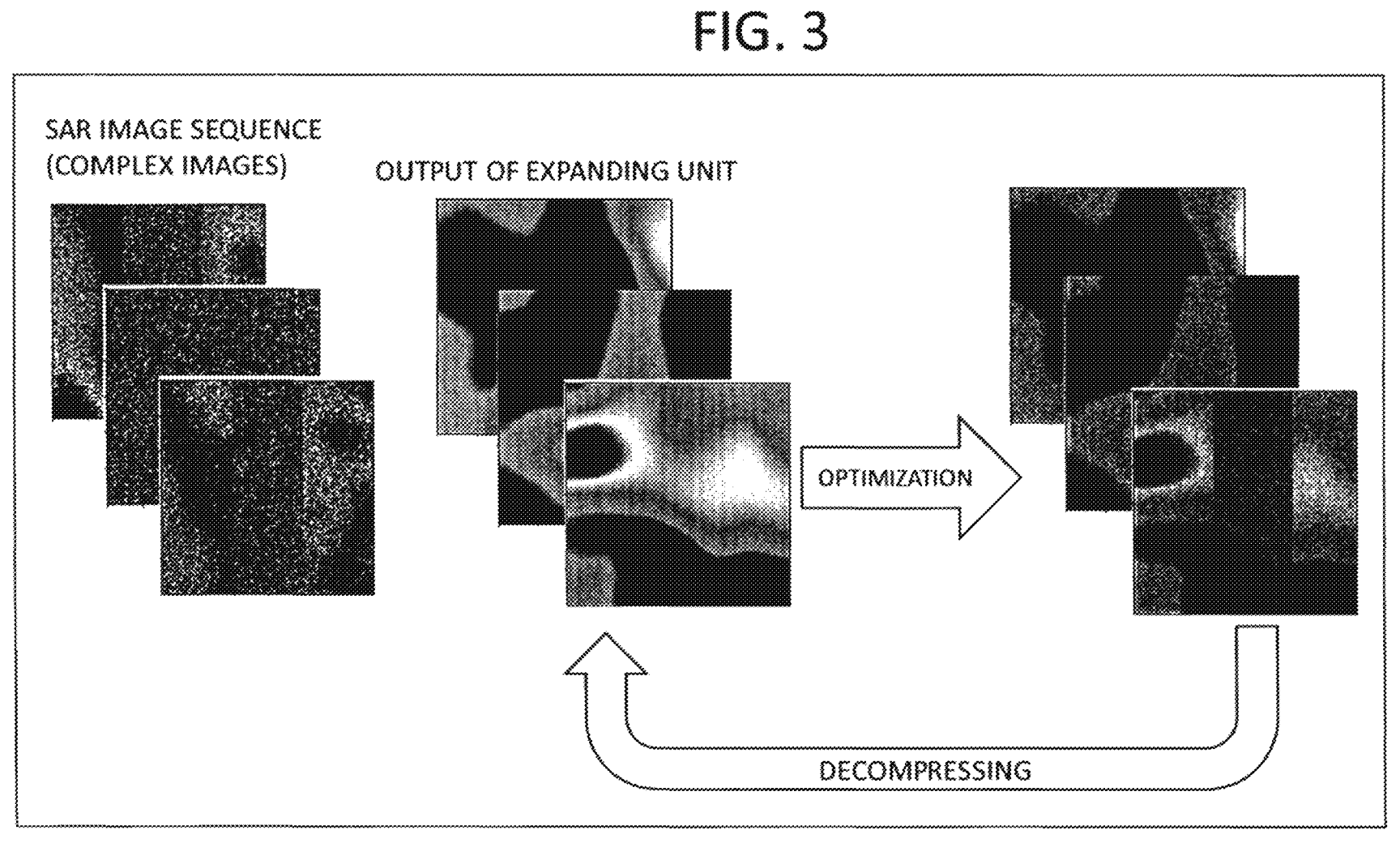

FIG. 3 is an explanatory diagram showing an example of a processing result of the dimension reduction unit 120, the expanding unit 130 and the optimization unit 140 in the image analysis device 10. The left side of FIG. 3 shows an example of three input SAR images that contain noise. For example, the area extending in a vertical direction is the area containing relatively high noise. The expanding unit 130 outputs data such that the phase changes smoothly in comparison with the data of the input SAR images (refer to the center part in FIG. 3). When the optimization unit 140 performs the optimizing process using the evaluation function, since the observed pixel values are also taken into account, the processing result reflects the effect of noise to some extent (refer to the right side in FIG. 3).

However, as the processing by the dimension reduction unit 120 and the expanding unit 130 is repeated, the spatial correlation phase estimate converges to an optimal phase where the phase changes smoothly.

This example embodiment is suitable for applications where, for example, spatially low-frequency phase components are extracted robustly to noise. A spatially low-frequency phase component is, for example, a phase delay due to moisture in the atmosphere. Since this phase delay is a phase unrelated to displacement, the performance of displacement analysis can be improved by performing estimation in this example embodiment and excluding the phase from the observed phase when displacement analysis is performed, for example.

[Modification]

Figure 4:
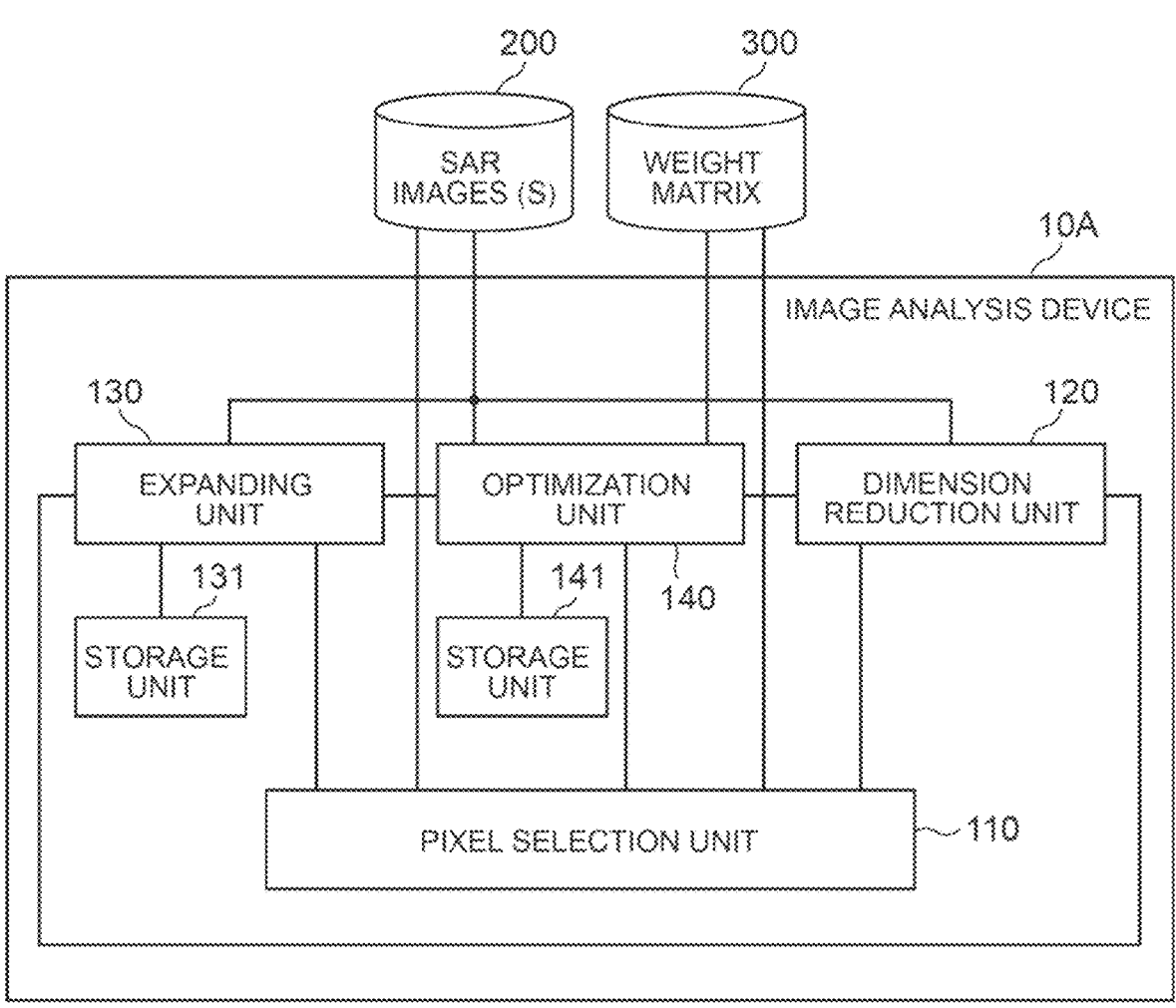
FIG. 4 It depicts a block diagram showing a modification of the image analysis device of the first example embodiment.

FIG. 4 is a block diagram showing a modification of the image analysis device of this example embodiment. The image analysis device 10A shown in FIG. 4 further includes a storage unit 131 and a storage unit 141 in addition to the components of the image analysis device 10 shown in FIG. 1.

In the image analysis device 10A, the expanding unit 130 outputs an absolute value or phase or both of the spatial correlation phase estimate $V_{samp}$ $f_s$ to the storage unit 131. The storage unit 131 stores the absolute value or phase or both of the spatial correlation phase estimate $V_{samp}$ $f_s$. The expanding unit 130 may output the absolute value or phase or both of the spatial correlation phase estimate $V_{samp}$ $f_s$ to the storage unit 131 each time one loop process (process of steps S101 to S104) is executed, and the storage unit 131 may store, for example, the latest absolute value or phase or both of the spatial correlation phase estimate $V_{samp}$ $f_s$. The expanding unit 130 may output the absolute value or phase or both of the spatial correlation phase estimate $V_{samp}$ $f_s$ when the loop process has been executed a predetermined number of times. In that case, the storage unit 131 stores data when the data is output from the expanding unit 130.

The optimization unit 140 outputs an absolute value or phase or both of $x_{samp,s}$ to the storage unit 141. The storage unit 141 stores the absolute value or phase or both of $x_{samp,s}$. The optimization unit 140 may output the absolute value or phase or both of $x_{samp,s}$ to the storage unit 141 each time one loop process is executed, and the storage unit 141 may, for example, store the latest absolute value or phase or both of the $x_{samp,s}$. The optimization unit 140 may output the absolute value or phase or both of $x_{samp,s}$ when the loop process has been executed a predetermined number of times. In that case, the storage unit 141 stores data when the data is output from the optimization unit 140.

The absolute value or phase stored in the storage unit 131 or the storage unit 141 can be used for various uses. For example, the phase can be utilized as a phase from which noise has been removed. The absolute value can be used as a value (reliability) representing reliability of noise removal.

Although FIG. 4 shows an example where both the storage unit 131 and the storage unit 141 are installed, only one of the storage unit 131 and the storage unit 141 may be installed.

Example Embodiment 2

Figure 5:
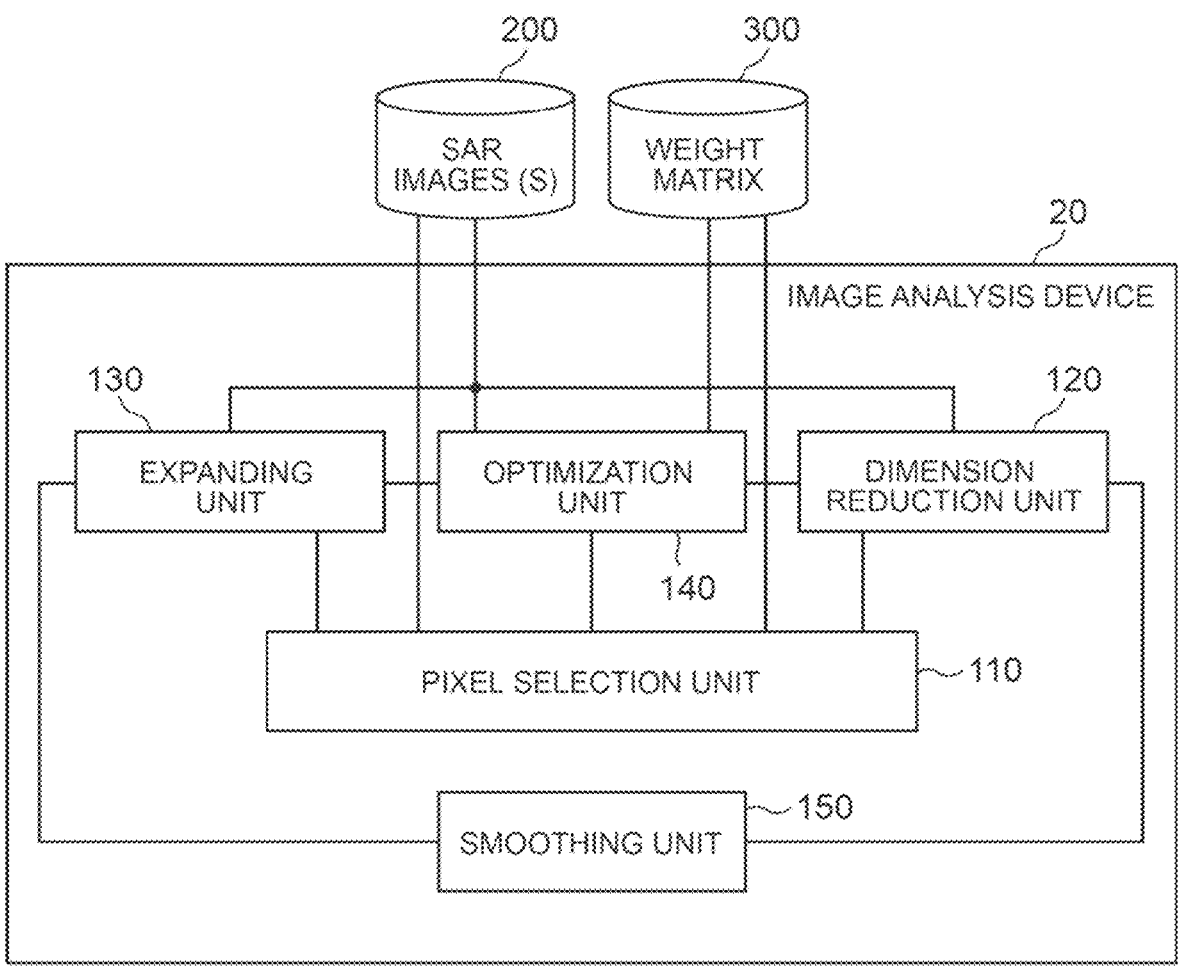
FIG. 5 It depicts a block diagram showing the image analysis device of the second example embodiment.

FIG. 5 is a block diagram showing a configuration example of the image analysis device of the second example embodiment. The image analysis device 20 shown in FIG. 5 further includes a smoothing unit 150 in addition to the components of the image analysis device 10 shown in FIG. 1. The smoothing unit 150 smooths output of the dimension reduction unit 120. In this example embodiment, smoothing means to smooth the output of the dimension reduction unit 120 in time.

Figure 6:
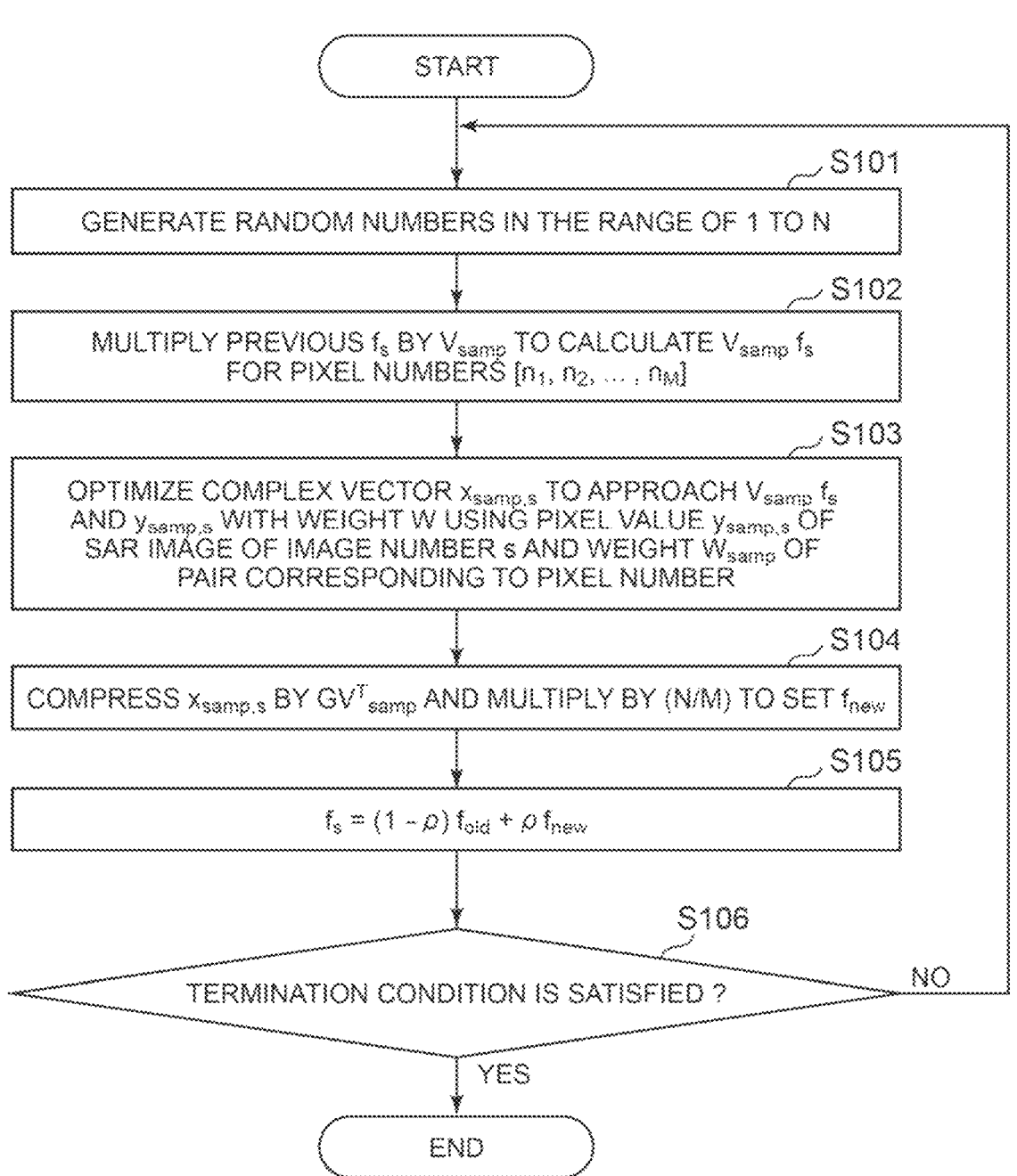
FIG. 6 It depicts a flowchart showing an operation of the image analysis device of the second example embodiment.

Next, the operation of the image analysis device 20 in this example embodiment will be explained with reference to the flowchart of FIG. 6. The processing of steps S101 to S104 and S106 is the same as that in the first example embodiment. In FIG. 6, in the processing of step S104, "$f_{new}$" is indicated instead of "fs", but the content of the processing of step S104 is not changed.

The smoothing unit 150 takes $f_s$ as the value obtained by smoothing $f_{new}$ using following equation (2), for example. In equation (2), $f_{new}$ is the output of the dimension reduction unit 120. That is, $f_{new}$ corresponds to $f_s$ in the first example embodiment. $f_{old}$ is output of the dimension reduction unit 120 in one previous loop process (steps S101 to S104). That is, $f_{old}$ corresponds to $f_s$ calculated by the dimension reduction unit 120 in the previous process. $f_{old}$ was stored in the dimension reduction unit 120. $\rho$ ($0<\rho<1$) is a reflection ratio of $f_{old}$. $\rho$ is a predefined value.

$$f_s = (1-\rho)f_{old} + \rho f_{new} \qquad (2)$$

In the first example embodiment, in each loop process, the pixel selection unit 110 randomly selects pixels. As a result, the value of $f_s$ calculated in step S104 in one loop process may have changed significantly from the value of $f_s$ calculated in step S104 in the previous loop process.

In this example embodiment, it is expected that the value of $f_s$ passed to the expanding unit 130 will be closer to the value of $f_s$ passed last time. Thus, it is more likely to converge to the appropriate spatial correlation phase estimate earlier.

Example Embodiment 3

Figure 7:
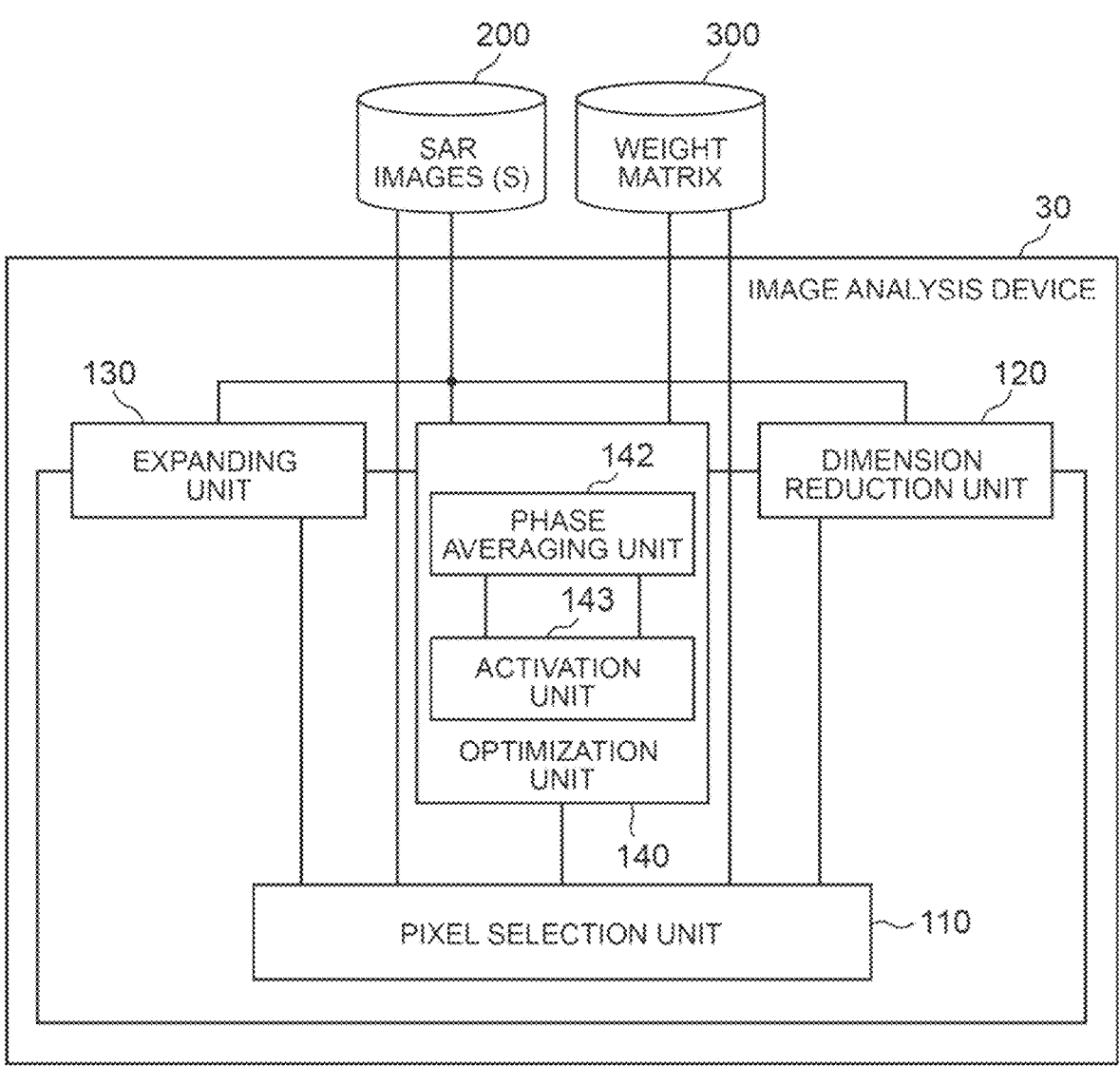
FIG. 7 It depicts a block diagram showing a configuration example of the image analysis device of the third example embodiment.

FIG. 7 is a block diagram showing a configuration example of the image analysis device of the third example embodiment. The configuration of the image analysis device 30 shown in FIG. 7 is basically the same as that of the image analysis device 10 of the first example embodiment. However, in the third example embodiment, the optimization unit 140 is embodied. That is, in the third example embodiment, a specific example of the optimization unit 140 is shown. The processing of the pixel selection unit 110, the dimension reduction unit 120 and the expanding unit 130 is the same as it in the first example embodiment.

As shown in FIG. 7, in this example embodiment, the optimization unit 140 includes a phase averaging unit 142 and an activation unit 143. The phase averaging unit 142 adds values of the observation signal evaluation function and the spatial correlation evaluation function used in the first example embodiment, as illustrated in equation (3) below.

[Math. 2]

$$x_{temp} = \Sigma_{s' \neq s} w_{n_m,s,s'} y_{n_m,s} \overline{y_{n_m,s'}} x_{n_m,s} + \chi_{means,n_m,s} \qquad (3)$$

In equation (3), the second term on the right side ($\chi$means, $n_m$,s) corresponds to the output of the expanding unit 130. That is, $\chi$ corresponds to $V_{samp}$ $f_s$ as the spatial correlation phase estimate in the first example embodiment.

In equation (3), the first term on the right side corresponds to a specific example of the observation signal evaluation function in the first example embodiment. In the first term, s and s' correspond to the image numbers of the images selected from S SAR images. As mentioned above, $n_m$ is synonymous with "samp" in the first example embodiment.

Next, the operation of the optimization unit 140 in this example embodiment will be explained with reference to the flowchart of FIG. 8. Hereinafter, the process of the phase averaging unit 142 which uses data such that the phase output by the expanding unit 130 changes smoothly is referred to as a phase averaging process.

The optimization unit 140 initializes the variable i to 0 (step S131). Then, the optimization unit 140 sets the variable i to +1 (step S132). The phase averaging unit 142 in the optimization unit 140 performs a phase averaging process using equation (3) to obtain a temporary value $x_{temp}$ (step S133).

The activation unit 143 applies an activation process to $x_{temp}$ to obtain $xn_m,s$ (step S134). $xn_m,s$ is synonymous with $x_{samp,s}$ in the first example embodiment. In the equation (3), "n" in $xn_m,s$ is represented by a subscript. $xn_m,s$ is the same as the variable whose "n" is represented by a subscript in the equation (3).

In the process of step S134, the activation unit 143 performs a nonlinear transformation of $x_{temp}$ using the nonlinear function g(a), as in equation (4) below.

[Math. 3]

$$x_{n_m,s} = \frac{g(|x_{temp}|)x_{temp}}{|x_{temp}|} \tag{4}$$

The following function can be used as the nonlinear function g(a).

$$g(a)=I_1(2a)/I_0(2a) \tag{5}$$

[Math. 4]

$$g(a) = \begin{cases} a < 1 & a \\ 1 \leq a & 1 \end{cases} \tag{6}$$

$$g(a)=\tanh(a) \tag{7}$$

$I_0$ and $I_1$ in equation (5) are first kind modified Bessel functions of order 0 and 1, respectively. When using equation (5), the value of g(a) approaches 1 as the value of a increases. Even when using equation (6) or equation (7), the value of g(a) approaches 1 as the value of a increases. Namely, in this example embodiment, the maximum value (in absolute value) of $xn_m,s$ is limited to 1.

Not limited to the functions illustrated in equations (5) to (7), the activation unit 143 can use other functions such that the output value asymptotically approaches from 0 to a specific positive value as a increases.

After the process of step S134 is executed, the optimization unit 140 checks whether i=S or not (step S135). That is, the optimization unit 140 checks whether steps S133, S134 have been executed for all SAR images. When i=S, the process is terminated. Otherwise, return to step S132.

The phase averaging unit 142 and the activation unit 143 may execute the process of steps S133, S134 sequentially, or they may execute the process of steps S133, S134 simultaneously (in parallel) for multiple i. The method of parallel execution is suitable for parallel computation by a GPU (Graphics Processing Unit) or CPU (Central Processing Unit), etc., and can speed up the optimizing process.

The storage unit 131 or the storage unit 141 or both, as shown in FIG. 4, may be added to the image analysis device 30 of this example embodiment. The smoothing unit 150, as shown in FIG. 5, may also be added to the image analysis device 30 of this example embodiment. The storage unit 131 or the storage unit 141 or both and the smoothing unit 150 may be added to the image analysis device 30 of this example embodiment.

The absolute value of the output ($xn_m,s$) of the optimization unit 140 in this example embodiment can be utilized as a value (reliability) representing the reliability of noise removal. This is because the image analysis device 30 is configured to increase the absolute value of $x_{temp}$ when both the degree of spatial smoothness and the degree of match between x ($xn_m,s$) as the evaluation value and the observed pixel value y ($yn_m,s$) are high. Namely, in equation (3), the value of the first term is larger the closer the phase of the observed pixel value y is to the phase of x. In addition, the value of the second term is the smoothed value of x calculated in the previous loop process (steps S101 to S104). When the value of the second term and the value of the first term are added, the value of $x_{temp}$ is larger in case the value based on the second term and the value based on the first term have close phases. Thus, the absolute value of $x_{temp}$ is larger the higher the reliability. Therefore, the absolute value of $xn_m,s$ is also larger the higher the reliability.

In particular, when the storage unit 141 is installed, the absolute value of $xn_m,s$ stored in the storage unit 141 can be effectively used as the reliability.

Figure 9:
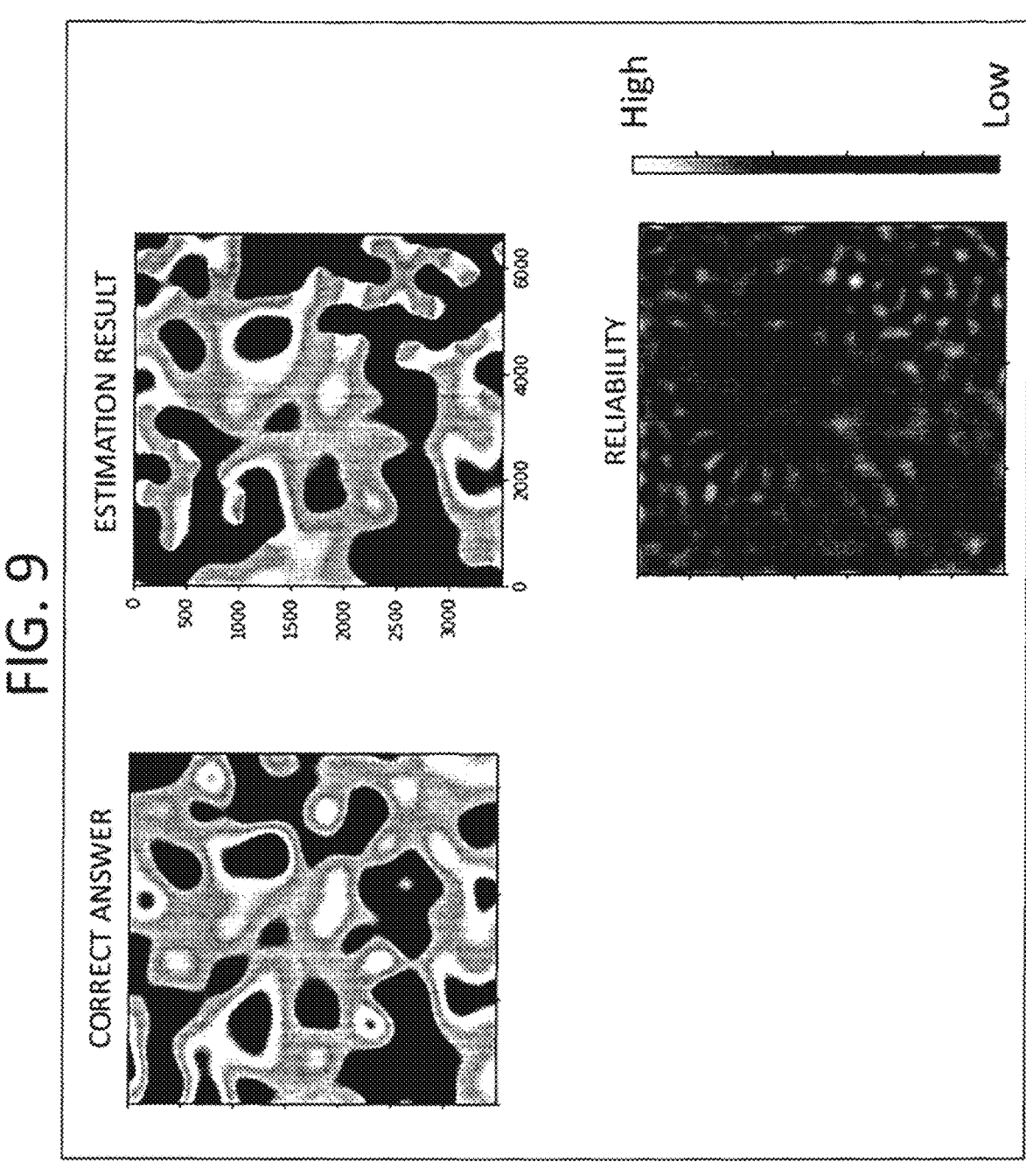
FIG. 9 It depicts an explanatory diagram for explaining the effect of the third example embodiment.

FIG. 9 is an explanatory diagram for explaining the effect of this example embodiment. The estimated value of the phase by the image analysis device 30 is illustrated in the upper right in FIG. 9. When the estimated value of phase is compared with the correct answer, there are areas where they do not match. The reliability of the estimated value of the phase is illustrated in the lower right in FIG. 9. As mentioned above, the reliability is the absolute value of $xn_m,s$. The larger the absolute value, the higher the reliability.

Figure 10:
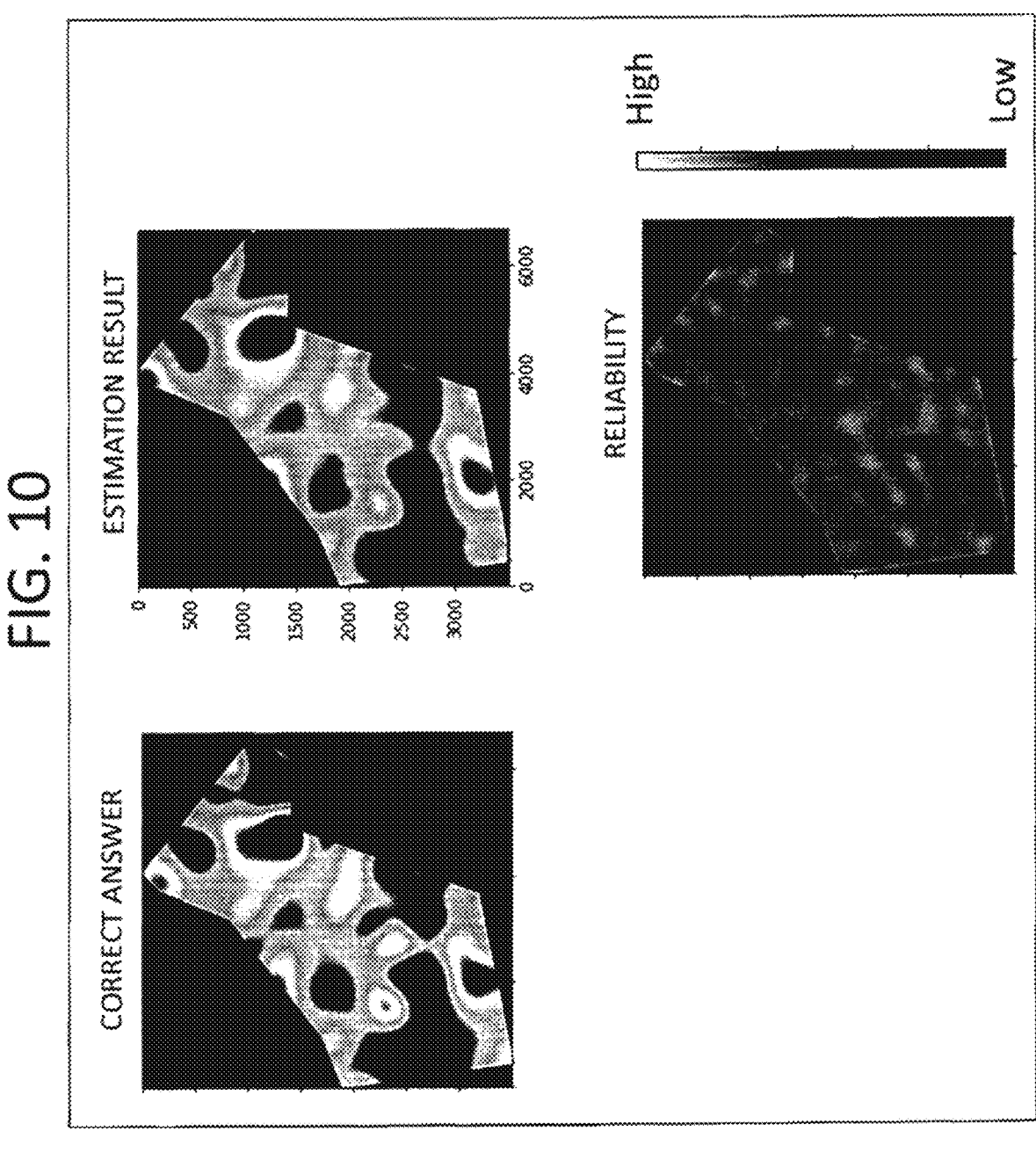
FIG. 10 It depicts an explanatory diagram showing an application of the third example embodiment.

FIG. 10 is an explanatory diagram showing an application of this example embodiment. As an example, areas with low reliability in the estimation result can be excluded and used for some analysis or other. In FIG. 10, the black areas are areas to be excluded.

Further, the reliability in this example embodiment can also be applied to an application in which areas where the analysis results cannot be trusted are displayed visually after displacement analysis or the like has been performed based on the estimated value of the phase.

Example Embodiment 4

Figure 11:
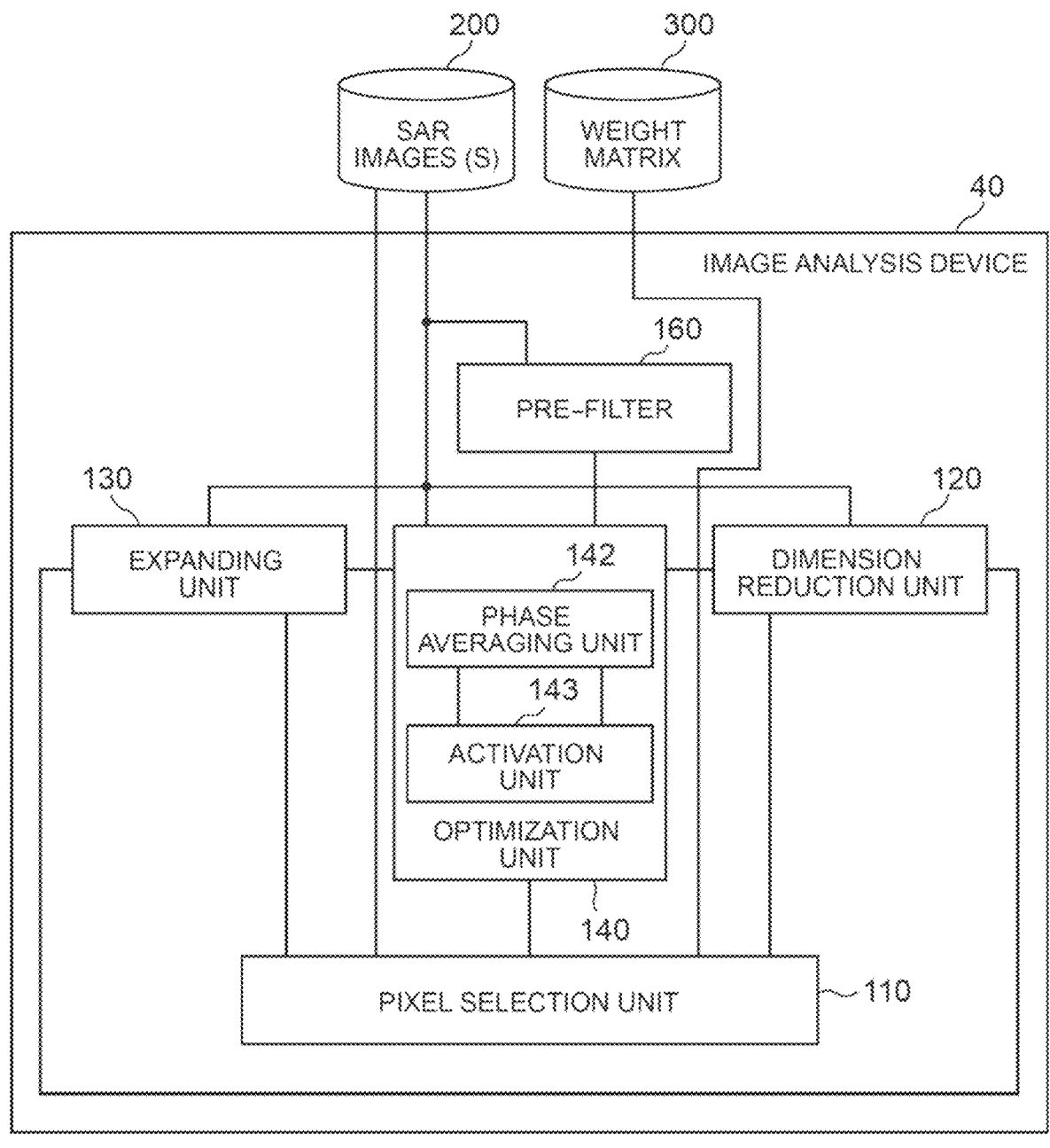
FIG. 11 It depicts a block diagram showing a configuration example of the image analysis device of the fourth example embodiment.

FIG. 11 is a block diagram showing a configuration example of the image analysis device of the fourth example embodiment. The image analysis device 40 shown in FIG. 11 further includes a pre-filter 160 in addition to the components of the image analysis device 30 shown in FIG. 7. In the image analysis device 40, the pixel selection unit 110, the dimension reduction unit 120, the expanding unit 130, and the optimization unit 140 which includes the phase averaging unit 142 and the activation unit 143 operate similarly to those in the third example embodiment. However, in this example embodiment, the phase averaging unit 142 uses a different evaluation function from it used by the phase averaging unit 142 in the third example embodiment.

The pre-filter unit 160 calculates a matrix F according to following equation (8), for example. In equation (8), "$W_{filter}$" is a predetermined weight. "n∈Ω ($n_m$)" is any of the M selected pixels. Since the numerator of equation (8) includes a product of $y_{n,s}$ and the conjugate complex number of $y_{n,s'}$, equation (8) means that a phase difference between neighboring observed pixels are averaged by $W_{filter}$. A matrix (hereinafter, expressed as matrix $\Gamma$ which does not include a subscript) shown in equation (8) represents some noise feature in the observed image. The matrix $\Gamma$ is reflected in the evaluation function used by the phase averaging unit 142 in this example embodiment.

[Math. 5]

$$\Gamma_{n_m,s,s'} = \frac{\sum_{n \in \Omega(n_m)} W_{filter} y_{n,s} \overline{y_{n,s'}}}{\sum_{n \in \Omega(n_m)} W_{filter}} \tag{8}$$

Figure 8:
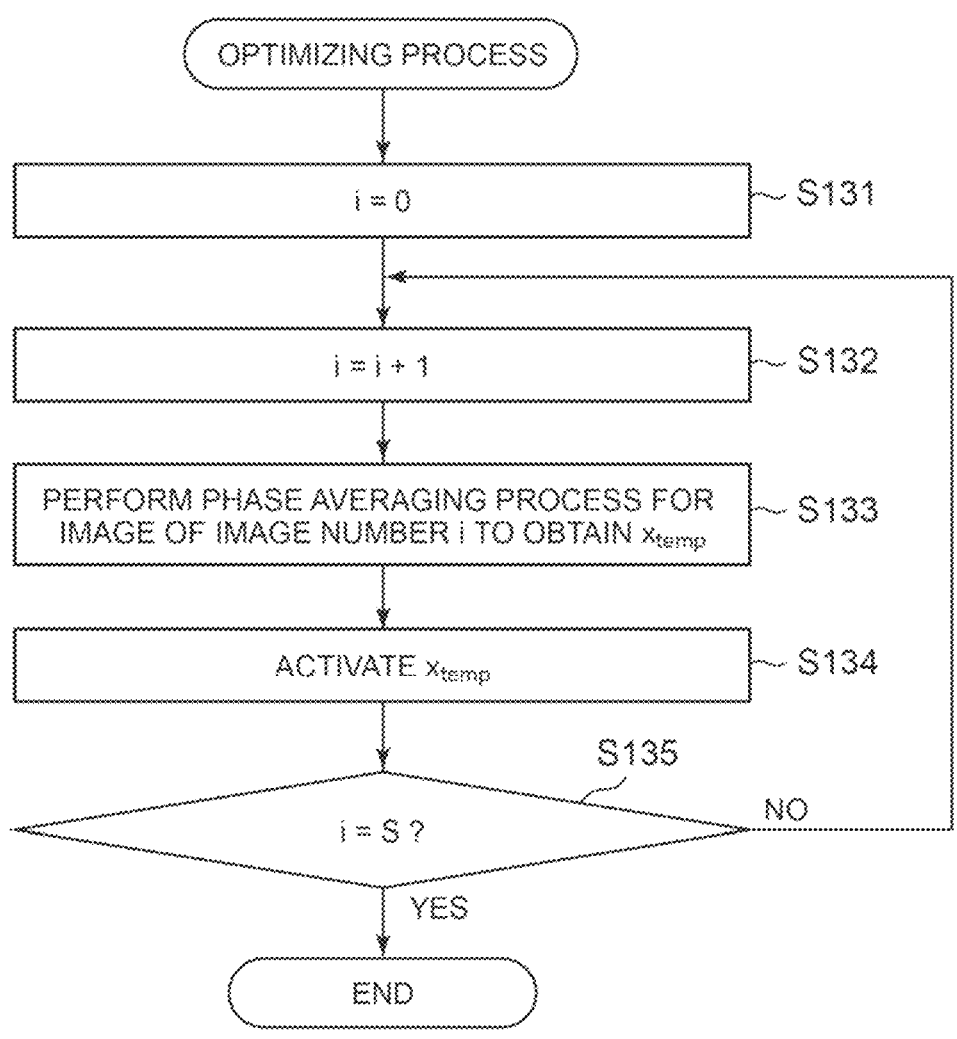
FIG. 8 It depicts a flowchart showing an operation of the optimization unit in the image analysis device of the third example embodiment.

The phase averaging unit 142 performs the same process as step S133 in FIG. 8. However, in this example embodiment, the phase averaging unit 142 calculates $x_{temp}$ using the following equation (9). Other processing is the same as that of the image analysis device 30 shown in FIG. 7. Equation (9) corresponds to an equation in which the product of $y_{n,s}$ and a conjugate complex number of $y_{n,s'}$ in equation (3) is replaced by the matrix F.

[Math. 6]

$$x_{temp} = \Sigma_{s' \neq s} w_{n_m,s,s'} \Gamma_{n_m,s,s'} x_{n_m,s'} + \chi_{means,n_m,s} \tag{9}$$

In this example embodiment, since the pre-filter 160 determines a weight matrix that reflects an average of the phase difference between the neighboring observation pixels, the optimal weight can be determined from the information in the observation image. In addition, since the phase averaging unit 142 calculates $x_{temp}$ using an evaluation function that includes the matrix $\Gamma$ reflecting the average of the phase difference between the neighboring observation pixels, the degree of phase noise reduction can be further increased.

Example Embodiment 5

Figure 12:
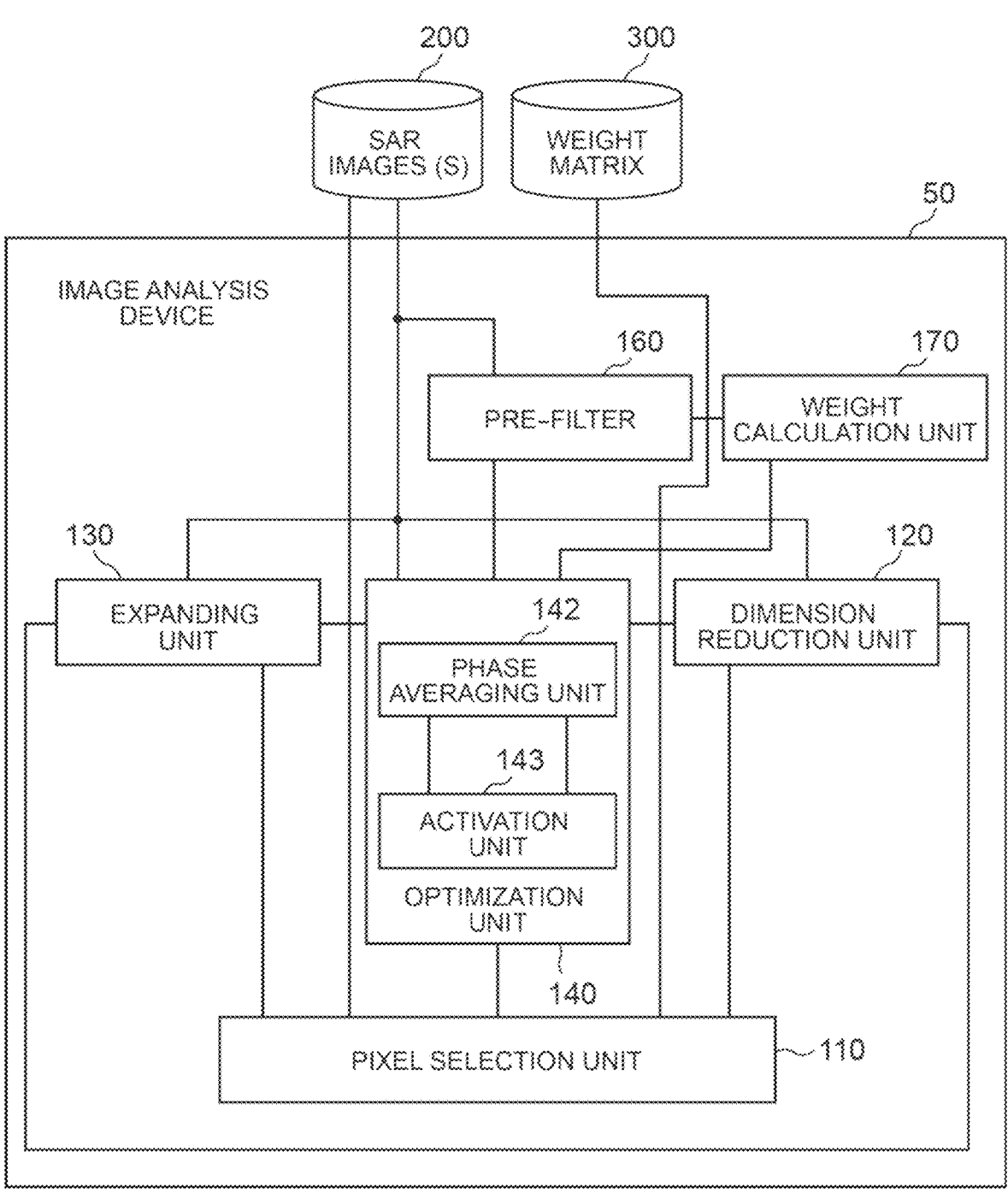
FIG. 12 It depicts a block diagram showing a configuration example of the image analysis device of the fifth example embodiment.

FIG. 12 is a block diagram showing an example configuration of the image analysis device of the fifth example embodiment. The image analysis device 50 shown in FIG. 11 further includes a weight calculation unit 170 in addition to the components of the image analysis device 40 shown in FIG. 11.

The weight calculation unit 170 calculates a weight $Wn_m$ as shown in following equation (10). That is, the weight calculation unit 170 calculates the weight $Wn_m$ based on the matrix $\Gamma$.

[Math. 7]

$$w_{n_m} = -|\Gamma_{n_m}|^{-1} \tag{10}$$

Other operations in the image analysis device 50 are the same as those in the fourth example embodiment.

Figure 13:
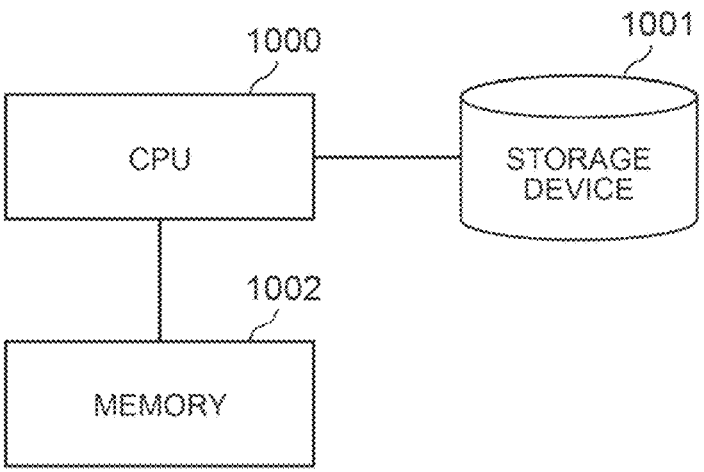
FIG. 13 It depicts a block diagram showing an example of a computer with a CPU.

FIG. 13 is a block diagram showing an example of a computer having a CPU. The computer is implemented in image analysis devices of each of the above example embodiments. The CPU 1000 executes processing in accordance with a program (software component: codes) stored in a storage device 1001 to realize the functions in the above example embodiments. That is to say, the functions of the pixel selection unit 110, the dimension reduction unit 120, the expanding unit 130, the optimization unit 140, the phase averaging unit 142, the activation unit 143, the smoothing unit 150, the pre-filter 160 and the weight calculation unit 170 in the image analysis devices 10, 10A, 20, 30, 40, 50 shown in FIG. 1, FIG. 4, FIG. 5, FIG. 7, FIG. 11, FIG. 12. Instead of CPU 1000, a GPU or a combination of a CPU and a GPU can be used.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a compact disc-read only memory (CD-ROM), a compact disc-recordable (CD-R), a compact disc-rewritable (CD-R/W), and a semiconductor memory (for example, a mask ROM, a PROM (programmable ROM), an EPROM (erasable PROM), a flash ROM). When a rewritable data storage medium is used as the storage device 1001, the storage device 1001 can also be used as the SAR image storage 200 and the weight matrix storage 300. The storage device 1001 can also be used as the storage units 131, 141.

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 14:
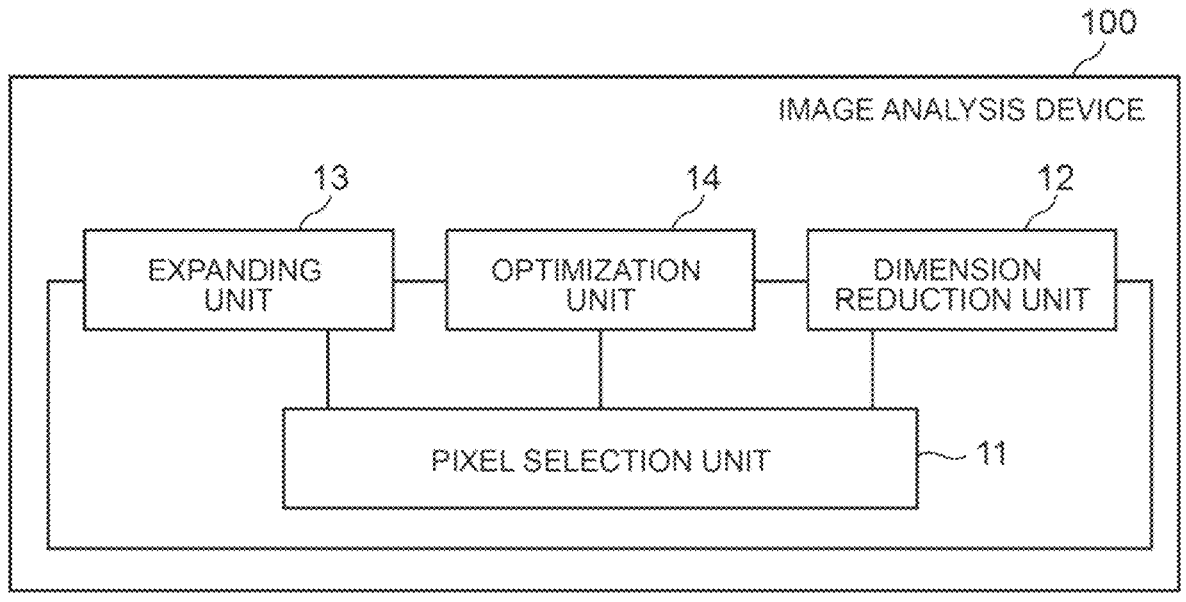
FIG. 14 It depicts a block diagram showing the main part of the image analysis device.

FIG. 14 is a block diagram showing the main part of the image analysis device. The image analysis device 100 shown in FIG. 14 comprises a pixel selection unit (pixel selection means) 11 (in the example embodiment, realized by the pixel selection unit 110) which selects multiple pixels at a plurality of positions in one image among multiple images in which the same area is recorded, a dimension reduction unit (dimension reduction means) 12 (in the example embodiment, realized by the dimension reduction unit 120) which compresses a complex vector as an evaluation value when an evaluation function is optimized into a low-dimensional space, a expanding unit (expanding means) 13 (in the example embodiment, realized by the expanding unit 130) which returns a compression result by the dimension reduction unit 12 to an original pixel space, and calculates a spatial correlation phase estimate; and an optimization unit (optimization means) 14 (in the example embodiment, realized by the optimization unit 140) which optimizes the evaluation function by bringing the evaluation value closer to the spatial correlation phase estimate and a pixel value at the position selected by the pixel selection unit 11.

Figure 15:
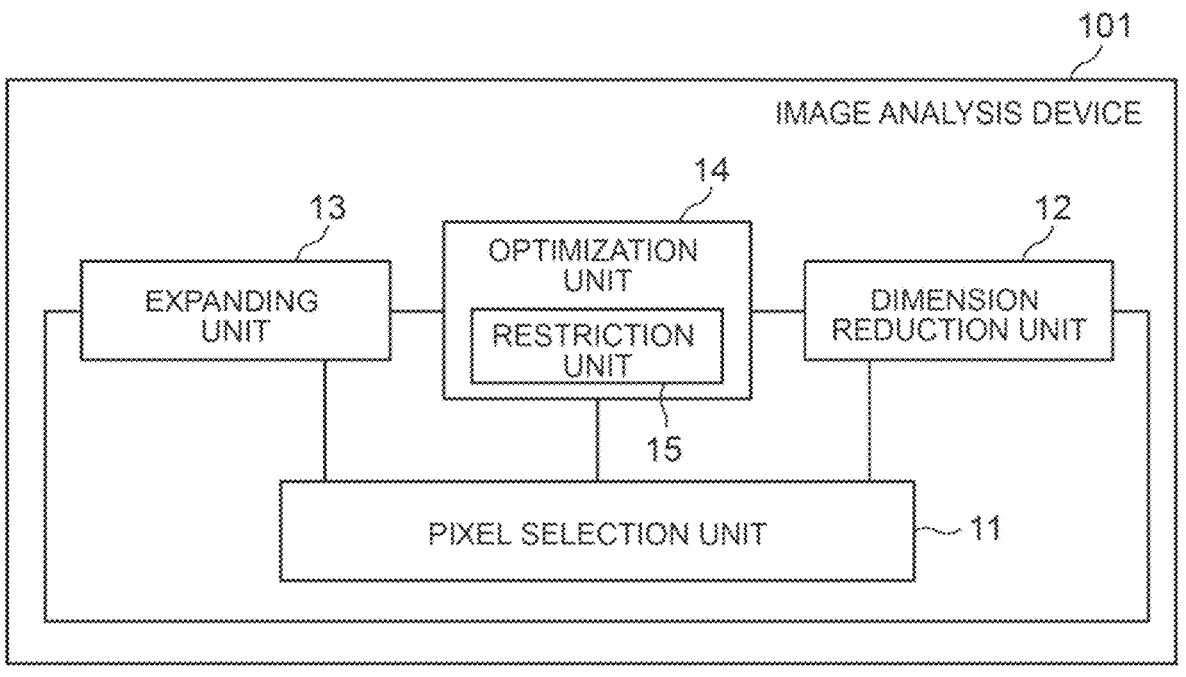
FIG. 15 It depicts a block diagram showing the main part of another type of the image analysis device.

FIG. 15 is a block diagram showing the main part of another type of the image analysis device. In the image analysis device 101 shown in FIG. 15, the evaluation function used by the optimization unit 14 includes terms which are added over multiple images, weighting a product of a complex number indicating a value of the pixel at the position selected by the pixel selection unit 11 and a conjugate complex number of the complex number, and the optimization unit 14 includes a restriction unit (restriction means) 15 (in the example embodiment, realized by the activation unit 143) which restricts a value obtained by optimizing the evaluation function to within a predetermined value by nonlinear transformation.

A part of or all of the above example embodiments may also be described as, but not limited to, the following supplementary notes.

(Supplementary note 1) An image analysis device comprising:

pixel selection means for selecting multiple pixels at a plurality of positions in one image among multiple images in which the same area is recorded;

dimension reduction means for compressing a complex vector as an evaluation value when an evaluation function is optimized into a low-dimensional space;

expanding means for returning a compression result by the dimension reduction means to an original pixel space, and calculating a spatial correlation phase estimate; and optimization means for optimizing the evaluation function by bringing the evaluation value closer to the spatial correlation phase estimate and a pixel value at the position selected by the pixel selection means.

(Supplementary note 2) The image analysis device according to Supplementary note 1, wherein the evaluation function includes terms which are added over multiple images, weighting a product of a complex number indicating a value of the pixel at the position selected by the pixel selection means and a conjugate complex number of the complex number, and the optimization means includes restriction means for restricting a value obtained by optimizing the evaluation function to within a predetermined value by nonlinear transformation.

(Supplementary note 3) The image analysis device according to Supplementary note 1 or 2, wherein the dimension reduction means multiplies the complex vector by a matrix for low-dimensional compression, and the expanding means derives the spatial correlation phase estimate by multiplying the compression result by the dimension reduction means by a matrix for expanding.

(Supplementary note 4) The image analysis device according to any one of Supplementary notes 1 to 3, further comprising smoothing means (in the example embodiment, realized by the smoothing unit 150) for smoothing the compression result by the dimension reduction means by a past compression result before supplying the compression result to the expanding means.

(Supplementary note 5) The image analysis device according to any one of Supplementary notes 1 to 4, further comprising absolute value storage means (in the example embodiment, realized by the storage unit 131) for storing an absolute value of an output of the expanding means.

(Supplementary note 6) The image analysis device according to any one of Supplementary notes 1 to 5, further comprising phase storage means (in the example embodiment, realized by the storage unit 131) for storing a phase of an output of the expanding means.

(Supplementary note 7) The image analysis device according to any one of Supplementary notes 1 to 4, further comprising absolute value storage means (in the example embodiment, realized by the storage unit 141) for storing an absolute value of an output of the optimization means.

(Supplementary note 8) The image analysis device according to any one of Supplementary notes 1 to 4 or Supplementary note 7, further comprising phase storage means (in the example embodiment, realized by the storage unit 141) for storing a phase of an output of the optimization means.

(Supplementary note 9) An image analysis method comprising:

selecting multiple pixels at a plurality of positions in one image among multiple images in which the same area is recorded;

compressing a complex vector as an evaluation value when an evaluation function is optimized into a low-dimensional space;

returning a compressing result to an original pixel space, and calculating a spatial correlation phase estimate; and optimizing the evaluation function by bringing the evaluation value closer to the spatial correlation phase estimate and a pixel value at the selected position.

(Supplementary note 10) The image analysis method according to Supplementary note 9, wherein the evaluation function includes terms which are added over multiple images, weighting a product of a complex number indicating a value of the pixel at the position selected by the pixel selection means and a conjugate complex number of the complex number, and further comprising restricting a value obtained by optimizing the evaluation function to within a predetermined value by nonlinear transformation.

(Supplementary note 11) A computer readable recording medium storing an image analysis program, wherein the image analysis program causes a computer to execute:

a process of selecting multiple pixels at a plurality of positions in one image among multiple images in which the same area is recorded;

a process of compressing a complex vector as an evaluation value when an evaluation function is optimized into a low-dimensional space;

a process of returning a compressing result to an original pixel space, and calculating a spatial correlation phase estimate; and a process of optimizing the evaluation function by bringing the evaluation value closer to the spatial correlation phase estimate and a pixel value at the selected position.

(Supplementary note 12) The recording medium according to Supplementary note 11, wherein the evaluation function includes terms which are added over multiple images, weighting a product of a complex number indicating a value of the pixel at the position selected by the pixel selection means and a conjugate complex number of the complex number, and wherein the image analysis program causes the computer to further execute a process of restricting a value obtained by optimizing the evaluation function to within a predetermined value by nonlinear transformation.

(Supplementary note 13) An image analysis program causing a computer to execute:

a process of selecting multiple pixels at a plurality of positions in one image among multiple images in which the same area is recorded;

a process of compressing a complex vector as an evaluation value when an evaluation function is optimized into a low-dimensional space;

a process of returning a compressing result to an original pixel space, and calculating a spatial correlation phase estimate; and a process of optimizing the evaluation function by bringing the evaluation value closer to the spatial correlation phase estimate and a pixel value at the selected position.

(Supplementary note 14) The image analysis program according to Supplementary note 13, wherein the evaluation function includes terms which are added over multiple images, weighting a product of a complex number indicating a value of the pixel at the position selected by the pixel selection means and a conjugate complex number of the complex number, and wherein the image analysis program causes the computer to further execute a process of restricting a value obtained by optimizing the evaluation function to within a predetermined value by nonlinear transformation.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

11 Pixel selection unit
12 Dimension reduction unit
13 Expanding unit
14 Optimization unit
15 Restriction unit
10, 10A, 20, 30, 40, 50 Image analysis device
100, 101 Image analysis device
110 Pixel selection unit
120 Dimension reduction unit
131, 141 Storage unit
130 Expanding unit
140 Optimization unit
142 Phase averaging unit
143 Activation unit
150 Smoothing unit
160 Pre-filter
170 Weight calculation unit
200 SAR image storage
300 Weight matrix storage
1000 CPU
1001 Storage device
1002 Memory

What is claimed is:

1. An image analysis device comprising:

a memory storing software instructions, and one or more processors configured to execute the software instructions to;

obtain, using synthetic aperture radar (SAR) technology, multiple SAR images in which a same area is recorded;

select multiple first pixels at a plurality of positions in a first SAR image among the multiple SAR images, identify second pixels in one or more second SAR images corresponding to a same position as one of the first pixels in the first SAR image, and specifies a common position in the first SAR image and the second SAR image;

optimize an evaluation function by bringing an evaluation value closer to a spatial correlation phase estimate and a pixel value at the specified common position;

compress a complex vector as the evaluation value obtained by optimizing the evaluation function into a low-dimensional space; and return a compression result to an original pixel space, and calculate the spatial correlation phase estimate, wherein the evaluation function comprises adding first terms corresponding to observed pixel values and second terms corresponded to the spatial correlation phase estimate by weighting a product of a complex number indicating the pixel value at the specified common position and a conjugate complex number of the complex number.

2. The image analysis device according to claim 1, wherein the one or more processors are configured to execute the software instructions to restrict a value obtained by optimizing the evaluation function to within a predetermined value by nonlinear transformation.

3. The image analysis device according to claim 1, wherein the one or more processors are configured to execute the software instructions to;

multiply the complex vector by a matrix for low-dimensional compression, and derive the spatial correlation phase estimate by multiplying the compression result by a matrix for expanding.

4. The image analysis device according to claim 1, wherein the one or more processors are further configured to execute the software instructions to:

smooth the compression result by a past compression result.

5. The image analysis device according to claim 1, further comprising:

absolute value storage configured to store an absolute value of an output of an expanding process.

6. The image analysis device according to claim 1, further comprising:

phase storage configured to store a phase of an output of an expanding process.

7. The image analysis device according to claim 1, further comprising:

absolute value storage configured to store an absolute value of an output of an optimizing process.

8. The image analysis device according to claim 1, further comprising:

phase storage configured to store a phase of an output of an optimizing process.

9. An image analysis method, implemented by a processor, comprising:

obtaining, using synthetic aperture radar (SAR) technology, multiple SAR images in which a same area is recorded;

selecting multiple first pixels at a plurality of positions in a first SAR image among the multiple SAR images, identifying second pixels in one or more second SAR images corresponding to a same position as one of the first pixels in the first SAR image, and specifying a common position in the first SAR image and the second SAR image;

optimizing an evaluation function by bringing an evaluation value closer to a spatial correlation phase estimate and a pixel value at the specified common position;

compressing a complex vector as the evaluation value obtained by optimizing the evaluation function into a low-dimensional space; and returning a compressing result to an original pixel space, and calculating a spatial correlation phase estimate, wherein the evaluation function comprises adding first terms corresponding to observed pixel values and second terms corresponded to the spatial correlation phase estimate by weighting a product of a complex number indicating the pixel value at the specified common position and a conjugate complex number of the complex number.

10. The image analysis method, implemented by the processor, according to claim 9, further comprising restricting a value obtained by optimizing the evaluation function to within a predetermined value by nonlinear transformation.

11. A non-transitory computer readable recording medium storing an image analysis program which, when executed by a processor, performs:

obtaining, using synthetic aperture radar (SAR) technology, multiple SAR images in which a same area is recorded;

selecting multiple first pixels at a plurality of positions in a first SAR image among the multiple SAR images, identifying second pixels in one or more second SAR images corresponding to a same position as one of the first pixels in the first SAR image, and specifying a common position in the first SAR image and the second SAR image;

optimizing an evaluation function by bringing an evaluation value closer to a spatial correlation phase estimate and a pixel value at the specified common position;

compressing a complex vector as the evaluation value obtained by optimizing the evaluation function into a low-dimensional space;

returning a compressing result to an original pixel space, and calculating a spatial correlation phase estimate; and optimizing the evaluation function by bringing the evaluation value closer to the spatial correlation phase estimate and a pixel value at the selected position, wherein the evaluation function comprises adding first terms corresponding to observed pixel values and second terms corresponded to the spatial correlation phase estimate by weighting a product of a complex number indicating the pixel value at the specified common position and a conjugate complex number of the complex number.

12. The non-transitory computer readable recording medium according to claim 11, wherein the image analysis program further performs restricting a value obtained by optimizing the evaluation function to within a predetermined value by nonlinear transformation.

* * * * *